3,085,087
PREPARATION OF CARBOXYALKYL
CELLULOSE ETHERS
John E. Henry, Hopewell, Va., and George A. Reasor,
Kalamazoo, Mich., assignors to Hercules Powder Company, Wilmington, Del., a corporation of Delaware
No Drawing. Filed Sept. 13, 1956, Ser. No. 609,540
1 Claim. (Cl. 260—231)

This invention relates to an improved process of preparing carboxyalkyl cellulose ethers and, more particularly, to such a process wherein an improved liquid medium is employed to give uniform and efficient etherification of cellulose and, consequently, alkali-soluble and water-soluble cellulose ethers of improved quality.

Ethers of this type, e.g. carboxymethylcellulose, usually are made by reacting cellulose with a carboxyalkyl etherifying agent, such as a halogenated lower fatty acid or salt thereof, in the presence of caustic alkali and water. As soon as the reaction has advanced enough so that the cellulose ether being formed has a substitution in excess of about 0.4, it dissolves in the aqueous alkali and coagulates into a viscous dough which is difficult to process both in completing the etherification and in purifying the cellulose ether product. Degree of substitution (D.S.) used herein means the average number of hydroxyl groups present per anhydroglucose unit of cellulose which have been substituted by ether groups, three being complete substitution of the cellulose.

In this art, it has been known for a long time that uniform substitution of cellulose has a great beneficial effect not only in increasing the efficiency of the etherification reaction but also on the quality of the resulting ethers. Likewise, it has long been known in this art that uniform distribution of the alkali and water on the cellulose prior to etherification is vitally important to the efficiency of etherification and the quality of the cellulose ethers thus produced. The degree of substitution, of course, is directly proportional to the quantity of etherifying agent consumed throughout the etherifying reaction. Thus on the extent of uniformity of substitution depends whether the percent yield of cellulose ether based on etherifying agent is high or low and whether the cellulose ether dissolves to give clear solutions or contains unreacted fibers and forms turbid solutions.

In view of the importance of the foregoing, several methods have been proposed in an effort to accomplish the desired result, and some of these methods have been considered of sufficient merit to place in operation. However, great difficulties have been encountered and, insofar as known, all prior art processes leave something to be desired, either better economy or better quality of product or both. Prior art methods involving steeping and pressing procedure for the preparation of alkali cellulose have been uneconomical because the alkali cellulose prepared in this way retains far more caustic alkali and water than is required for the desired etherification. Various dough-mixing and dry-mixing procedures have been proposed to overcome the inherent shortcomings of steeping processes. These have not given uniformity to the desired extent because the small amounts of caustic alkali and water required for economically preparing alkali-soluble and water-soluble cellulose ethers cannot be uniformly distributed on the cellulose by such mixing procedures.

While slurry processes heretofore proposed have many desirable features, and the slurry principle is being successfully used on a commercial scale today, they are not entirely satisfactory. Prior art slurry processes either involve the use of inert water-immiscible diluents such as, e.g., toluene, benzene, hexane, and ethyl ether or inert water-miscible diluents such as, e.g., aliphatic alcohols having 2–5 carbon atoms, dioxane and tetrahydrofuran. The disadvantages characteristic of water-immiscible diluents are that they cause undesirably low reaction efficiency and uniformity of substitution. Too, the water-immiscible diluents are not as effective as desired to inhibit coagulation of the cellulose ether into a doughy mass, difficult to process, as the ether is being produced. The chief disadvantage characteristic of water-miscible diluents is that they are expensive per se. Further, they do not render the process as efficient as desired because a portion of the alkali and etherifying agent dissolves in the aqueous solution of these water-miscible diluents and reduces the yield of ether.

An object of this invention is an improved process of preparing carboxyalkyl cellulose ethers. A further object is such a process characterized by increased efficiency and economy of operation. A still further object is a process of uniformly etherifying cellulose to obtain ethers of improved quality. An additional object is a process of preparing carboxyalkyl cellulose ethers wherein an improved liquid medium is employed during the process. These and other objects will be apparent from the description of this invention given hereinafter.

According to the present invention, it has been found that the above and other objects are accomplished by carrying out the process which comprises thoroughly mixing cellulose, caustic alkali and a carboxyalkyl etherifying agent and thereby etherifying the cellulose in the presence of a liquid medium (diluent) comprising a mixture of water, a water-miscible aliphatic alcohol of 2–4 carbon atoms and a water-immiscible inert organic liquid. The overall process is then completed in a more or less conventional manner. Thus the diluent is separated from the cellulose ether as by simple draining or centrifuging, and the cellulose ether is purified by washing. The cellulose ether remains in a solid state after being produced in the diluent and has a fibrous structure similar to that of the starting cellulose.

The following examples illustrate specific and preferred ways of practicing the present invention; however, the invention is not to be limited to these specific embodiments. Unless otherwise indicated, in the examples and elsewhere herein parts and percent are by weight and cellulose is on an air-dry basis. Conversion efficiency is the percentage of the monochloroacetic acid (MCA) charged which is consumed in producing carboxymethyl groups. For example, if one mole of MCA is consumed per anhydroglucose unit of cellulose and a D.S. of 1.0 is obtained, then the MCA conversion efficiency is 100%. Conversion efficiency is based on bone-dry cellulose.

In analyzing the following examples it should be kept in mind that solution properties, MCA efficiency and a D.S. are all important factors, and also that fiber rating is a more sensitive and therefore more precise measuring means than turbidity. Fiber rating is based on an arbitrary set of standards well known in this art. The scale for fibers is as follows, the solution quality becoming better as the fiber rating number decreases.

| Solution quality: | Fiber rating |
|---|---|
| Worst | Opaque |
| Better | 5+ |
| Better | 5 |
| Better | 4 |
| Better | 3 |
| Best | 2 |

In these examples the preparation of carboxymethylcellulose was chosen because it is quite typical of the carboxyalkyl cellulose ethers.

EXAMPLE 1 (TABLE 1)

In these examples sodium hydroxide in water solution was added to the diluent. The specified amount of air-dried comminuted cellulose (Table 1 below) was added with agitation to the alkali-diluent mixture to form a slurry of the cellulose therein. After an alkali cellulose period (45–60 minutes at 20° C.–25° C.), monochloroacetic acid was added to the slurry. The temperature of the reaction mixture thus prepared was brought to reaction temperature during a period of approximately 30 minutes and then held at this temperature for the additional time indicated (Table 1 below). Example 14 was carried out in an autoclave because of the high temperature employed. Agitation was employed throughout the mixing and the reaction. The resulting cellulose ether product at this stage of the process was fibrous and similar in appearance to the starting cellulose. After draining the liquid from the product, it was suspended in methanol of 70% concentration and neutralized with acetic acid. Then the neutralized product was drained and washed with additional 70% methanol, dehydrated with anhydrous methanol, and air-dried at 70° C. With the exception of Example 4, wherein the "solution properties" were determined on a 1% solution, 2% solutions were employed. Viscosity was measured in centipoises at 25° C. in an aqueous solution of the ether, a 1% solution being used in Examples 4 and 15–18, and a 2% solution in all other examples. For each part of cellulose in all examples, there was used 0.60 part of monochloroacetic acid and 0.55 part of sodium hydroxide (based on 100% sodium hydroxide). The various ratios apply at the start of the reaction and therefore do not account for changes in water content or other materials during the reaction. However, the reaction mixture is in the form of a slurry throughout the reaction. "Parts water" in Table 1 includes the total amount of water present in the reaction mixture at the start of the reaction (except the approximately 5% by weight of cellulose in the air-dry cellulose used) whether the water is added as such or included in the sodium hydroxide or other materials of the reaction mixture.

ertness of the water-immiscible diluents to the caustic and etherifying agent, reduced loss of diluents due to evaporation, and making it possible to employ higher etherification temperatures without pressure equipment by virtue of the higher boiling point diluents and thereby reducing the etherification time. The water-miscible aliphatic alcohols applicable are those of 2–4 carbon atoms and mixtures thereof and include, e.g., ethanol, n-propanol, isopropanol, n-butanol, sec-butanol, isobutanol, tert-butanol, methyl propyl carbinol, diethyl carbinol, and methyl isopropyl carbinol. Water immiscible inert organic diluents in general are applicable and include aliphatic hydrocarbons, e.g., heptane, hexane; aromatic hydrocarbons, e.g., toluene, xylene, benzene; ketones, e.g., methyl ethyl ketone; ethers, e.g., ethyl ether, isopropyl ether; halogenated hydrocarbons, e.g., carbon tetrachloride.

Although the order in which the cellulose, diluent, alkali and water are mixed is not important, a preferred order of preparing a charge is to place the diluent in a reactor, add the desired amount of water to sodium hydroxide and mix the resulting solution well with the diluent, then agitate a suspension of cellulose into the diluent-sodium hydroxide-water mixture. The total time of preparing this mixture and cellulose suspension therein usually will vary over a period of about 10 minutes to 20 minutes. Following this, there may or may not be an alkali cellulose period which comprises continuing the agitation ordinarily from about ½ to 1½ hours at approximately room temperature. In addition the resulting alkali cellulose may or may not be aged for any desired period of time. Then the monochloroacetic acid or other etherifying agent is agitated into the alkali cellulose mixture and the final reaction mixture subjected to a temperature of 25° C.–150° C. for 1–6 hours (usually 50° C.–75° C. for 1½ to 2½ hours) while continuing to agitate throughout the reaction. The liquid is drained from the solid fibrous reaction product and the diluent is easily recovered for reuse. Ordinarily, the product is further processed as by purifying and dehydrating. This comprises, e.g., washing the product with a nonsolvent such as methanol, neutralizing the free alkali with acetic acid, draining off the liquid, washing the product again

*Table 1 (Examples 1–18)*

| Ex No. | Diluent A, B | Parts diluent | Parts H₂O | Parts cellulose | D.S. | Reaction conditions | | Solution properties | | MCA efficiency, percent | Viscosity, cps. |
|---|---|---|---|---|---|---|---|---|---|---|---|
| | | | | | | Time (hr.) | Temp. (° C.) | Turbidity | Fiber rating | | |
| 1 | Heptane | A-891 | 160 | 100 | 0.49 | 1.5 | 70 | Opaque | Opaque | 45 | 3,800 |
| 2 | do | A-1163 | 40 | 100 | 0.69 | 1.5 | 70 | do | do | 64 | 1,100 |
| 3 | Heptane-ethanol | A-954, B-106 | 75 | 100 | 0.68 | 1.5 | 70 | Clear | 3 | 63 | 570 |
| 4 | do | A-1186, B-132 | 25 | 125 | 0.86 | 1.5 | 70 | Opaque | Opaque | 79 | 2,450 |
| 5 | do | A-954, B-106 | 55 | 100 | 0.75 | 1.5 | 70 | Clear | 3+ | 71 | 575 |
| 6 | do | A-785, B-261 | 67 | 100 | 0.70 | 1.5 | 70 | do | 3 | 70 | 355 |
| 7 | do | A-1025.4, B-53.9 | 58 | 100 | 0.61 | 1.5 | 70 | do | 3 | 57 | 590 |
| 8 | Heptane-isopropanol | A-788, B-25.3 | 80 | 100 | 0.76 | 1.5 | 70 | Hazy | 3+ | 70 | 610 |
| 9 | Toluene | A-1125 | 80 | 100 | 0.60 | 1.5 | 70 | Opaque | Opaque | 55 | 670 |
| 10 | Toluene-ethanol | A-1085, B-51.3 | 58 | 100 | 0.71 | 1.5 | 70 | Hazy | 3+ | 66 | 675 |
| 11 | Hexane-ethanol | A-1023, B-51.3 | 58 | 100 | 0.71 | 2.5 | 50 | Clear | 3 | 64 | 490 |
| 12 | Isoproplyl ether | A-1125 | 60 | 100 | 0.57 | 2.5 | 50 | Opaque | Opaque | 53 | 600 |
| 13 | Isopropyl ether-ethanol | A-1052, B-79 | 60 | 100 | 0.54 | 2.5 | 50 | Hazy | 5 | 50 | 2,000 |
| 14 | Ethyl ether-ethanol | A-87, B-29 | 6.6 | 10 | 0.77 | 0.5 | 115 | Clear | 4 | 71 | 52 |
| 15 | Benzene-ethanol | A-1134.9, B-126.1 | 75 | 125 | 0.77 | 1.5 | 70 | Slightly hazy | 3 | 71 | 3,400 |
| 16 | Methyl ethyl ketone-ethanol | A-461.1, B-24.3 | 50 | 50 | 0.71 | 4.0 | 50 | Very hazy | 4+ | 66 | 1,820 |
| 17 | CCl₄-ethanol | A-526.7, B-58.5 | 20 | 25 | 0.72 | 3.0 | 60 | do | 4+ | 66 | 130 |
| 18 | Toluene-butanol | A-1134.9, B-126.1 | 75 | 125 | 0.77 | 1.5 | 70 | do | 3+ | 71 | 3,040 |

As compared with employing a water-immiscible diluent alone, the foregoing examples illustrate the distinct and important advantages of employing as a diluent a mixture of a water-miscible alcohol and a water immiscible inert organic liquid. These advantages have already been described and include improved quality of product as well as efficiency and ease of preparation. As compared with water-miscible diluents alone, the tremendous cost advantage realized by practicing this invention is quite apparent. Other advantages of this invention include ease of recovering the diluents for reuse, greater inwith anhydrous methanol, and finally air-drying the cellulose ether product.

The foregoing examples clearly illustrate that the extreme difficulty and inoperability of employing water-immiscible diluents alone can be overcome by adding a water-miscible diluent thereto in amounts of only a very small fraction of the water-immiscible diluent. Thus, e.g., the addition of only 5% water-miscible diluent (ethanol) to the water-immiscible diluent (heptane) gave substantially better results; the addition of 10% gave still better results; and the addition of 25% gave no apparent further improvement as compared with 10% addition. While amounts outside these are operable, they are not preferred. The percent water-miscible diluent employed in the diluent mixture will depend on the actual degree of water miscibility of the water-miscible diluent being used, the amount required being inversely proportional to its degree of water miscibility. Similarly, the degree of water miscibility of the water-immiscible component influences the amount of water-miscible diluent required. For instance, the higher the miscibility with water of the water-miscible and water-immiscible materials used, the lower the amount of water-miscible material that will be required, and conversely. Thus, although the preferred percentage composition of the diluent mixture will vary depending on a number of factors, normally below about 5% water-miscible diluent does not give as good results as desired and above about 50% would be approaching the point at which one main object of the invention would begin to be defeated. The total amount of combined diluents may vary widely, e.g., about 5–25 parts per part of cellulose. While there is a clear line of division between water-miscible and water-immiscible materials, their miscibility with water varies depending on the particular material concerned. By water-miscible and water-immiscible as used herein is meant substantially completely to completely miscible or immiscible with water.

This invention is applicable to preparing any carboxyalkyl cellulose which is insoluble in the diluents employed. These include, e.g., carboxymethylcellulose, carboxypropyl cellulose, carboxybutyl cellulose, and variations thereof effected by substitution in the alkyl group. Since the reaction is carried out in the presence of a strong alkali, normally the final product is the alkali salt of the carboxyalkyl ether. However, the free acid form may be obtained by well-known means, e.g., by treating the salt with a mineral acid or an ion exchange resin process. Too, the free acid can be converted into various other salts, if desired.

While alkali metal hydroxides are preferred, especially sodium hydroxide, any of the strong alkali hydroxides are suitable. Any amount of alkali is operable short of rendering the cellulose ether product soluble in the spent reaction mixture. Usually the preferred amount of alkali (based on sodium hydroxide) is about 0.1–2.0 parts per part of cellulose.

Useful etherifying agents beside monochloroacetic acid include other halogenated lower fatty acids, e.g., chloropropionic acid, chlorobutyric acid and alkali metal salts thereof. The corresponding bromine and iodine compounds are also suitable but more expensive. Among other things, the D.S. desired will determine the amount of etherifying agent employed. Generally this will be about 0.01–3.0 parts of etherifying agent (based on monochloroacetic acid) per part of cellulose. Also, about 0.25–1.0 mole of etherifying agent per mole of free alkali is preferred (based on monochloroacetic acid and sodium hydroxide, respectively).

While chemically purified cotton linters, wood pulp and various other cellulosic materials are satisfactory for use in the process of this invention, the preferred ones are purified cotton linters and α-cellulose wood pulp.

What we claim and desire to protect by Letters Patent is:

The process of preparing an alkali metal salt of carboxymethyl cellulose which comprises agitating cellulose, free alkali and monochloroacetic acid in a liquid medium comprising water, carbon tetrachloride and ethanol, the resulting ether product remaining in a solid undissolved state in the reaction mixture until recovered, said carbon tetrachloride and ethanol being present from the beginning of the process.

References Cited in the file of this patent

UNITED STATES PATENTS

| | | |
|---|---|---|
| 1,884,629 | Dreyfus | Oct. 25, 1932 |
| 2,096,681 | Lorand | Oct. 19, 1937 |
| 2,181,264 | Dreyfus | Nov. 28, 1939 |
| 2,517,577 | Klug et al. | Aug. 8, 1950 |
| 2,524,024 | Swinehart et al. | Sept. 26, 1950 |

FOREIGN PATENTS

| | | |
|---|---|---|
| 526,370 | Great Britain | Sept. 17, 1940 |